US008997115B2

(12) United States Patent
Bauer et al.

(10) Patent No.: US 8,997,115 B2
(45) Date of Patent: Mar. 31, 2015

(54) METHOD FOR DATA DELIVERY IN A NETWORK

(75) Inventors: Daniel N. Bauer, Birmensdorf (CH); Luis Garces-Erice, Zurich (CH); John G. Rooney, Zurich (CH); Paolo Scotton, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 1598 days.

(21) Appl. No.: 12/192,622

(22) Filed: Aug. 15, 2008

(65) Prior Publication Data

US 2009/0064177 A1  Mar. 5, 2009

(30) Foreign Application Priority Data

Aug. 31, 2007 (EP) ..................... 07115458

(51) Int. Cl.
*G06F 13/00* (2006.01)
*G01R 31/08* (2006.01)
*G06F 9/54* (2006.01)

(52) U.S. Cl.
CPC ................ *G06F 9/544* (2013.01); *G06F 9/545* (2013.01)
USPC ........... 719/314; 370/229; 370/230; 370/232; 370/235

(58) Field of Classification Search
None
See application file for complete search history.

(56) References Cited

U.S. PATENT DOCUMENTS

| | | | | |
|---|---|---|---|---|
| 5,278,984 | A * | 1/1994 | Batchelor | 719/314 |
| 5,870,089 | A * | 2/1999 | Fabbio et al. | 715/733 |
| 6,252,851 | B1 * | 6/2001 | Siu et al. | 370/236 |
| 6,401,136 | B1 * | 6/2002 | Britton et al. | 719/314 |
| 6,457,054 | B1 | 9/2002 | Bakshi | |
| 6,529,932 | B1 * | 3/2003 | Dadiomov et al. | 718/101 |
| 7,085,266 | B2 * | 8/2006 | Calvignac et al. | 370/360 |
| 7,158,479 | B1 | 1/2007 | Noble | |
| 7,185,099 | B1 | 2/2007 | Block | |
| 7,613,830 | B2 * | 11/2009 | Srinivasan et al. | 709/245 |
| 7,895,601 | B2 * | 2/2011 | Benner et al. | 719/314 |

(Continued)

FOREIGN PATENT DOCUMENTS

WO  WO00/49825  8/2000

OTHER PUBLICATIONS

Ren Bin and Zhang Xiaolan, Enhanced Transaction TCP—Design Implementation, Oct. 2002, Published in China, Shanghai Jiaotong University, School of Electronics and Information Technology.

(Continued)

*Primary Examiner* — H S Sough
*Assistant Examiner* — Phuong Hoang
(74) *Attorney, Agent, or Firm* — Suiter Swantz pc llo

(57) ABSTRACT

A method for transmitting data between a sender queue of a sender intermediate layer of a protocol stack and a receiver queue of a receiver intermediate layer of the protocol stack implemented with a sliding window protocol. The method includes receiving a data message or a collection of data messages from a sender messaging layer; tagging the data message or the collection of data messages with a unique identifier; writing the data message or the collection of data messages tagged with the unique identifier as a data window in the sender queue; transmitting a front data window of the sender queue to the receiver queue; receiving a single receipt-acknowledgement message after the receiver transport layer has received all of the front data window; and receiving a commit-acknowledgement message after the receiver messaging layer has read from the receiver intermediate layer all of the front data window.

14 Claims, 2 Drawing Sheets

(56) References Cited

U.S. PATENT DOCUMENTS

| | | |
|---|---|---|
| 7,996,849 B2* | 8/2011 | Garrard et al. ............... 719/313 |
| 8,230,106 B2* | 7/2012 | Chan et al. .................. 709/235 |
| 2002/0049845 A1* | 4/2002 | Sreenivasan et al. ......... 709/226 |
| 2002/0191642 A1* | 12/2002 | Calvignac et al. ............ 370/474 |
| 2003/0123481 A1* | 7/2003 | Neale et al. .................. 370/466 |
| 2004/0215753 A1* | 10/2004 | Chan et al. .................. 709/223 |
| 2005/0050109 A1* | 3/2005 | Klein et al. .................. 707/200 |
| 2006/0050708 A1* | 3/2006 | Shapiro et al. ............... 370/394 |
| 2008/0222255 A1* | 9/2008 | Hall ............................. 709/206 |

OTHER PUBLICATIONS

Clemens Vasters, Introduction to Reliable Messaging With the Windows Communication Foundation, Jul. 2006, Windows Vista Technical Articles.

WebSphere MQ Telemetry Transport Quality of Service levels and flows, Print date Jun. 28, 2008, pp. 1-10.

* cited by examiner

METHOD FOR DATA DELIVERY IN A NETWORK

CROSS-REFERENCE TO RELATED APPLICATIONS

The present application claims the benefit under 35 U.S.C. §119 of the European Patent Office; Application Serial Number 07115458.7, filed Aug. 31, 2007 entitled "METHOD FOR DATA DELIVERY IN A NETWORK," which is incorporated herein by reference.

TECHNICAL FIELD

The present invention relates to a method for data delivery from a sender application to at least one receiver application in a network.

BACKGROUND

A transaction is a sequence of state changes, which are either all performed or not performed at all. In this regard, a transaction is said to complete if all the state changes in the sequence are performed. If one of the state changes cannot be performed, all the previous state changes that have been performed are undone, i.e. ☐ restored back to their original state, and the transaction is said to be rolled-back. Systems which are based on the performance of transactions are said to be transactional. An example of a transactional system is where an item is purchased over the Internet. In this case, the transaction, i.e. ☐ the purchase of the item, involves at least a sequence comprising two state changes: placing an order for the item and debiting the credit card of the purchaser for payment of the item.

A distributed transaction is one in which a state change pertaining to the transaction may be made on a distributed system such as, for example, different computers that are interconnected across a network. A central feature to implementing distributed transactions is that parts of the distributed system, which would be the different computers in the example given earlier of a distributed system, communicate with each other in a reliable manner. By this, it is meant that, for a transaction conducted between entities A and B of a distributed system, if entity A tells entity B running on a different computer that it should make a state change, then entity A should be informed by entity B that the state change has been made or not, for example. In certain applications and/or systems, it is imperative that transactional semantics are completed even if parts of the system that are engaged in the performance of the transaction fail. For example, it would be undesirable if a credit card is debited even though an order is ultimately not placed due to the failure of one of the machines involved in the purchase transaction.

To manage transactions between applications, software known as messaging middleware has been developed. Essentially, such messaging middleware takes over the role of ensuring that data sent from a sending application is received by the destination/receiving application for that data. In the absence of the messaging middleware, the sending and destination applications would each have to be customized to be able to communicate with the other and ensure that the data is reliably delivered. Previously-proposed messaging middleware includes MQ Telemetry Transport (MQTT). MQTT supports the so-called publish-subscribe messaging system whereby, when publication on a specific topic is done by a publishing application, those applications that have subscribed to that topic receive data pertaining thereto.

Reference is now made to FIG. 1 of the accompanying drawings in order to gain a better understanding of how MQTT may be applied in a messaging system using the publish-subscribe model. As can be seen from FIG. 1, an application that publishes on a subscribed topic, such an application being hereinafter referred to as the publisher 1, sends data pertaining to the topic to a broker 6. The broker 6 sends on this data to each application that has registered with the broker 6 to receive data on the topic, such an application being hereinafter referred to as a subscriber. Data delivery from the publisher 1 to the broker 6 is done via a hierarchy of layers underlying thereto. Underlying the publisher 1 is a messaging layer 2 and a transport layer 3, such an arrangement hereinafter being referred to as the publisher stack. Corresponding layers, messaging layer 5 and transport layer 4, are also arranged to underlie the broker 6, such an arrangement hereinafter being referred to as the broker stack. Although not shown in FIG. 1, a subscriber would be implemented in a stack having a composition corresponding to the publisher/broker stack and, like the publisher stack, is coupled to the broker stack via the network layer 7, which is, for example, the Internet.

In the example given in FIG. 1, the messaging layers 2, 5, are implemented with MQTT and the transport layers 3, 4 are implemented with the transmission control protocol (TCP). MQTT removes the need for the different applications such as, for example, the publisher-broker or broker-subscriber, to liaise with each other to ensure data delivery and is chosen on account of offering a simpler mechanism for the reliable delivery of data once to a destination application than previously-proposed messaging middleware. In conjunction with MQTT, TCP is implemented on account of the fact that it offers reliable and in-order delivery of data to a destination application. Specific details pertaining to TCP and/or the different layers underlying the transport layers 3, 4, by way of which data delivery from the publisher 1 to the broker 6 would be known to a skilled person and so shall not be given herein. Such layers are generally depicted as the network layer 7 in FIG. 1.

The MQTT protocol supports different modes of operation that may be chosen in accordance with the different levels of reliability to be implemented in an application. In particular, MQTT offers the possibility of the delivery of data exactly once to a destination application through the use of a so-called four-way handshake, which will be explained with reference being made to the publisher-broker scenario depicted in FIG. 1. For the avoidance of doubt, it is, of course, equally applicable to a broker-subscriber scenario and generally any system in where data is to be transferred from a sending application to a destination application.

Referring to FIG. 1, the four-way handshake would be implemented as follows:

The publisher 1 sends data on a topic to the broker 6;

On receiving the data, the broker 6 sends an indication of reception to the publisher 1;

On receiving the indication of reception, the publisher 1 indicates to the broker 6 that it has received the indication of reception, and The broker 6 completes the handshake by sending an acknowledgment to the publisher 1.

The four-way handshake has to be performed because, after the transmission of data from the publisher 1, there are some unknowns to be resolved before the state is restored to a consistent one, i.e. the transaction is said to have occurred. These are:

The publisher 1 does not know if the broker 6 has received the data;

The broker 6 does not know if the publisher 1 knows that it has received the data, The publisher 1 does not know if the broker 6 knows that it has received the indication of reception.

After the broker 6 has sent the acknowledgment to the publisher 1, the publisher 1 may resend the indication to the broker 6 that it has received the indication of reception message from the broker 6 without actually resending the data. In an alternative approach, after the broker 6 has sent the acknowledgment message that it has received the data to the publisher 1, the publisher 1 may resend the data and it is up to the broker 6 to deal with the multiple versions of the data.

The approach outlined above has the following inherent problems:

1. The messaging layers act independently of the transport layers. Thus, loss at the network layer may cause retransmission of data both at the transport layer and the messaging layer and the system may fail through, for example, pointless attempts at retransmissions.
2. Control flow is not supported at the messaging layers but only at the transport layers. Thus, if the rate at which data is read by the broker from its corresponding messaging layer is much less than that at which it is sent by messaging layer of the publisher, then the system may become saturated by the multiple retransmission of data that the publisher will perform on account of not having received an acknowledgment from the broker for such data within the predetermined time by which it would expect to have received such acknowledgment.
3. In-order data delivery may be more difficult to achieve. This is because the four-way handshake is completed on receipt of data by the broker before the next data is sent by the publisher. For this, at least four network exchanges may have to be performed, which upper-bounds the throughput of the system. Alternatively, the constraint of performing the handshake may be weakened, in which case delivery out of order may pose problems.
4. Unsuitability of high-volume data-transfer and limitation of the data-transfer rate on account of an acknowledgment message having to be sent for each data packet received by the broker.

The use of a buffer layer between MQTT and TCP is disclosed. However, there is no disclosure of how transactional semantics may be supported by the disclosed system in a manner such that data sent by the sending application to a destination application is not lost in the event of, for example, a system crash.

SUMMARY OF THE INVENTION

According to an embodiment of a first aspect of the present invention, there is provided method of delivering data from a sender application to at least one receiver application that are arranged in a protocol stack comprising: underlying the sender application, a sender messaging layer and a sender transport layer, and underlying the receiver application, a receiver messaging layer and a receiver transport layer, wherein the sender transport layer and the receiver transport layer are coupled by way of a network layer, the method comprising the steps of: incorporating a sender intermediate layer between the sender messaging layer and the sender transport layer and a receiver intermediate layer between the receiver messaging layer and the receiver transport layer; configuring the interface characteristics of the intermediate layers to be the same as for their corresponding transport layers; creating a sender queue in a non-volatile data storage component of the sender intermediate layer and a receiver queue in a non-volatile data storage component of the receiver intermediate layer, storing the data to be sent from the sender application to the receiver application in the sender queue, and transmitting the data stored in the sender queue to the receiver queue via the sender transport layer and the receiver transport layer. An advantage associated with an embodiment of the present invention is that, since the sender queue and the receiver queue are implemented in non-volatile data-storage in the sender intermediate layer and receiver intermediate layer, data may be recovered there from during a reboot operation after, for example, a failure of the network layer and/or the receiver application, and is not irretrievably lost.

Preferably, the sender queue and receiver queue are implemented with a sliding window protocol in which the sender intermediate layer is configured to transmit, in the transmitting step, a window of data stored in the sender queue to the receiver queue. In this case, the window of data may comprise a single data message or a collection of data messages destined for the receiver application. As will be explained in further detail here below, a single indication of reception is sent in respect of the data window. Thus, where the data window comprises a collection of data messages, this feature offers the advantage that an indication of reception need not be sent for each message. Thus, increased volumes of data may be processed without a proportional need for increased processing resources.

Desirably, in response to a commit message being received by the receiver intermediate layer from the receiver messaging layer in respect of the data read by the receiver messaging layer from the receiver queue, the receiver intermediate layer is configured to send an acknowledgment message to the sender intermediate layer with respect to the read data. As discussed earlier, the data in the sender queue is transmitted to the receiver queue. In this regard, the data is written into the sender queue using a write operation. Unless the queue is full, in which case the write operation would block, the data is now written into non-volatile data-storage. The data written into the sender queue is then written to the sender transport layer. From hereon, the data is conveyed via the network layer to the receiver application side, specifically to the receiver transport layer. The receiver intermediate layer is configured to read the data from the receiver transport layer and to write it to the receiver queue. The data is then read from the receiver queue by the receiver messaging layer. In response to the receiver transport layer receiving the data, an acknowledgment message is sent to the sender transport layer that the data has been received. In response to the receiver messaging layer reading the data from the receiver queue, it sends a commit message to the receiver intermediate layer. In response to receiving the commit message, the receiver intermediate layer is configured to send an acknowledgment message to the sender intermediate layer in respect of the data that has been read and committed to by the receiver messaging layer. The acknowledgment message sent by the receiver transport layer only gives confirmation that the data has been delivered at the transport layer level and cannot be taken as an implicit confirmation that the data has been propagated up to the receiver application. An advantage associated with an embodiment of the present invention is that the latter confirmation is explicitly derived from the acknowledgment message sent by the receiver intermediate layer in response to receiving the commit message from the receiver messaging layer.

Preferably, in response to the acknowledgment message being received by the sender intermediate layer, the sender queue is updated by the removal of the data in respect of which the acknowledgment message is received. This feature offers increased efficiency of data communication and processing resources.

Desirably, in response to the commit message being received by the receiver intermediate layer, the receiver queue is updated by the removal of the data in respect of which the commit message is received. This feature also offers increased efficiency of data communication and processing resources.

Preferably, an embodiment according to the first aspect of the present invention further comprises the step of measuring a round-trip time in accordance with the time taken by the receiver messaging layer to read the data from the receiver queue and to send the commit message to the receiver intermediate layer. This feature is also applied to estimate the round-trip time during the future transmission of data from the sender application to the receiver application. If, after expiry of the round-trip time an acknowledgment message is not received from the receiver intermediate layer, the sender intermediate layer is configured to retransmit the data in respect of which the acknowledgment message was expected. One of the advantages that the dynamic manner in which the round-trip time is estimated offers is that message retransmission is performed in a manner that takes into account the possibility that the rate at which the receiver messaging layer reads data from the receiver queue is slower than the rate at which data is sent by the sending messaging layer, for example.

Desirably, the acknowledgment message comprises information on the available data-storage capacity in the receiver queue. The information on the data-storage capacity of the receiver queue that is sent in the acknowledgment message is used to advantage in adjusting the flow control of data from the sender queue to the receiver queue, for example, by extending the data bandwidth that is transmitted from the sender queue to the receiver queue. In this way, the efficiency with which data is transmitted to the receiver application may be increased.

Preferably, in response to the acknowledgment message not having been received by the sender intermediate layer by the expiry of a predetermined time, an interrogation step is performed on the sender transport layer to determine if the data in respect of which the acknowledgment message is expected is in the sender transport layer. The sender intermediate layer may be configured to expect an acknowledgment message in respect of data transmitted to the receiver queue by the expiry of a predetermined time. For example, in one embodiment of the present invention, the predetermined time may be taken to be the round-trip time. If, on expiry of the predetermined time, the expected acknowledgment message is not received, an interrogation step is performed whereby the sender transport layer is interrogated for the presence of the data in respect of which the acknowledgment is expected. If this data is still in the sender transport layer, then the data will not be retransmitted from the sender queue to the sender transport layer and the sender intermediate layer is set to check for the acknowledgment message at a subsequent time. If the data is not in the sender transport layer, then the data is retransmitted thereto from the sender queue and from thereon to the receiver queue. In this way, failures at the application level and/or the network layer level can be handled by avoiding the pointless retransmission of data, for example.

Desirably, an embodiment according to the first aspect of the present invention further comprises the step of allocating a unique identifier to the data stored in the sender queue. This feature offers the advantage that, in the event that data is transmitted multiple times by the sender intermediate layer due to, for example, the round-trip time being incorrectly estimated and/or an acknowledgment message sent by the receiver intermediate layer getting lost, by way of the unique identifier tagged to the data, the receiver will know that it has already received that data and will drop it. Thus, increased efficiency of data delivery may be achieved. In an embodiment of the present invention, the unique identifier is a sequence number, which is defined as the total number of bytes added to the sender queue starting from its creation modulo the maximum value of the sequence number. This offers the advantage that the order of delivery of data taken by the receiver queue may be monitored from the sequence number.

Preferably, in the step of incorporating the intermediate layers in the protocol stack, the intermediate layers are each detachably plugged to their corresponding transport layers. This feature offers the advantage that, when transactional support is desired, the intermediate layers may be incorporated into the protocol stack without drastic modification to the overall stack structure and/or interfaces of the layers thereof.

According to an embodiment of a second aspect of the present invention, there is provided a protocol stack comprising: a sender application configured to send data, at least one receiver application for receiving the data sent by the sender application, a sender messaging layer and a sender transport layer arranged to underlie the sender application, a receiver messaging layer and a receiver transport layer arranged to underlie the receiver application, wherein the sender transport layer and the receiver transport layer are coupled by way of a network layer, the protocol stack further comprising: a sender intermediate layer incorporated between the sender messaging layer and the sender transport layer and a receiver intermediate layer incorporated between the receiver messaging layer and the receiver transport layer, the interface characteristics of the intermediate layers being configured to be the same as for their corresponding transport layers, and a sender queue in a non-volatile data storage component of the sender intermediate layer and a receiver queue in a non-volatile data storage component of the receiver intermediate layer, wherein the data to be sent to the receiver application is stored in the sender queue and the receiver queue is configured to receive the data stored in the sender queue via the sender transport layer and the receiver transport layer.

According to an embodiment of a third aspect of the present invention, there is provided a computer program comprising instructions for carrying out the steps of an embodiment according to the first aspect of the present invention when the computer program is executed on a computer system.

According to an embodiment of a fourth aspect of the present invention, there is provided a computer system comprising means for carrying out the steps of an embodiment according to the first aspect of the present invention.

Features of one aspect may be applied to any other aspect and vice versa.

In any of the above aspects, the various features may be implemented in hardware or as software modules running on one or more data processors.

BRIEF DESCRIPTION OF THE DRAWINGS

Reference will now be made, by way of example, to the accompanying drawings in which.

DETAILED DESCRIPTION

Figure 1:
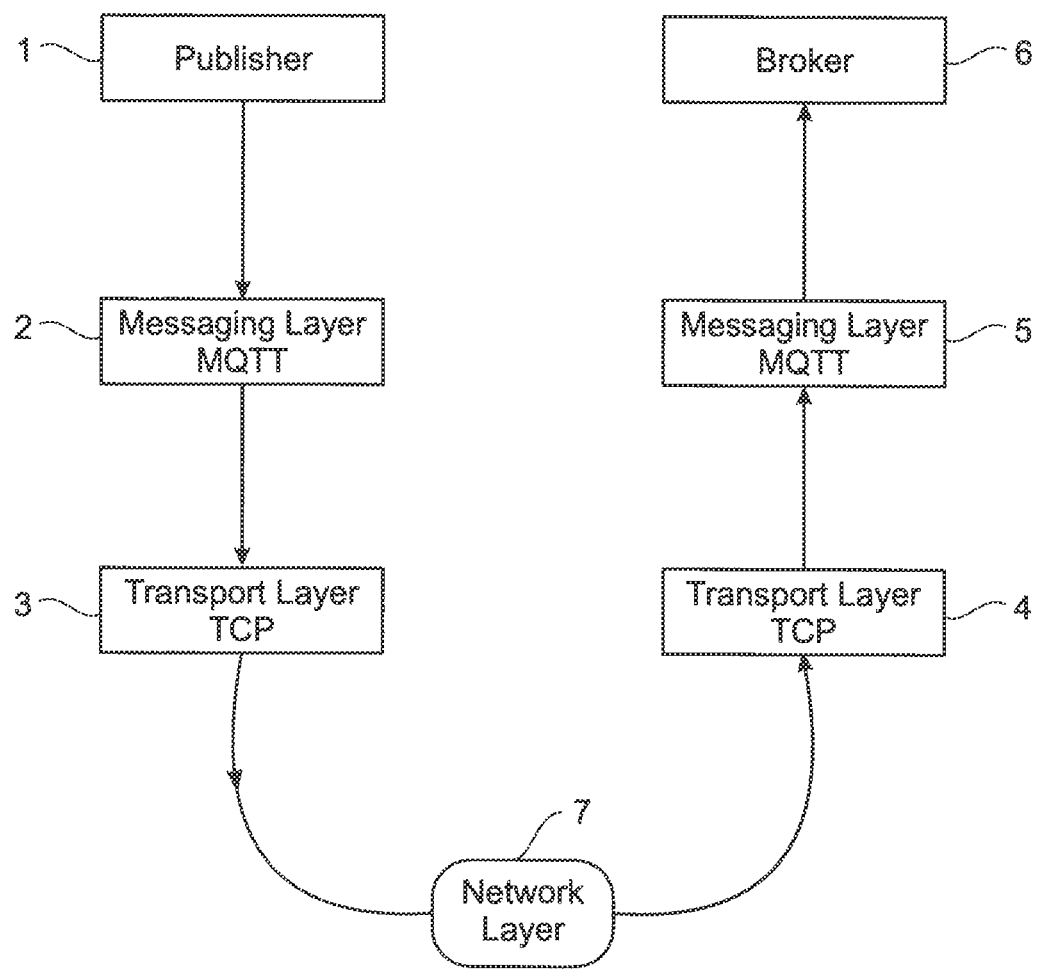
FIG. 1 (as described above) illustrates the principle of MQTT.
Figure 2:
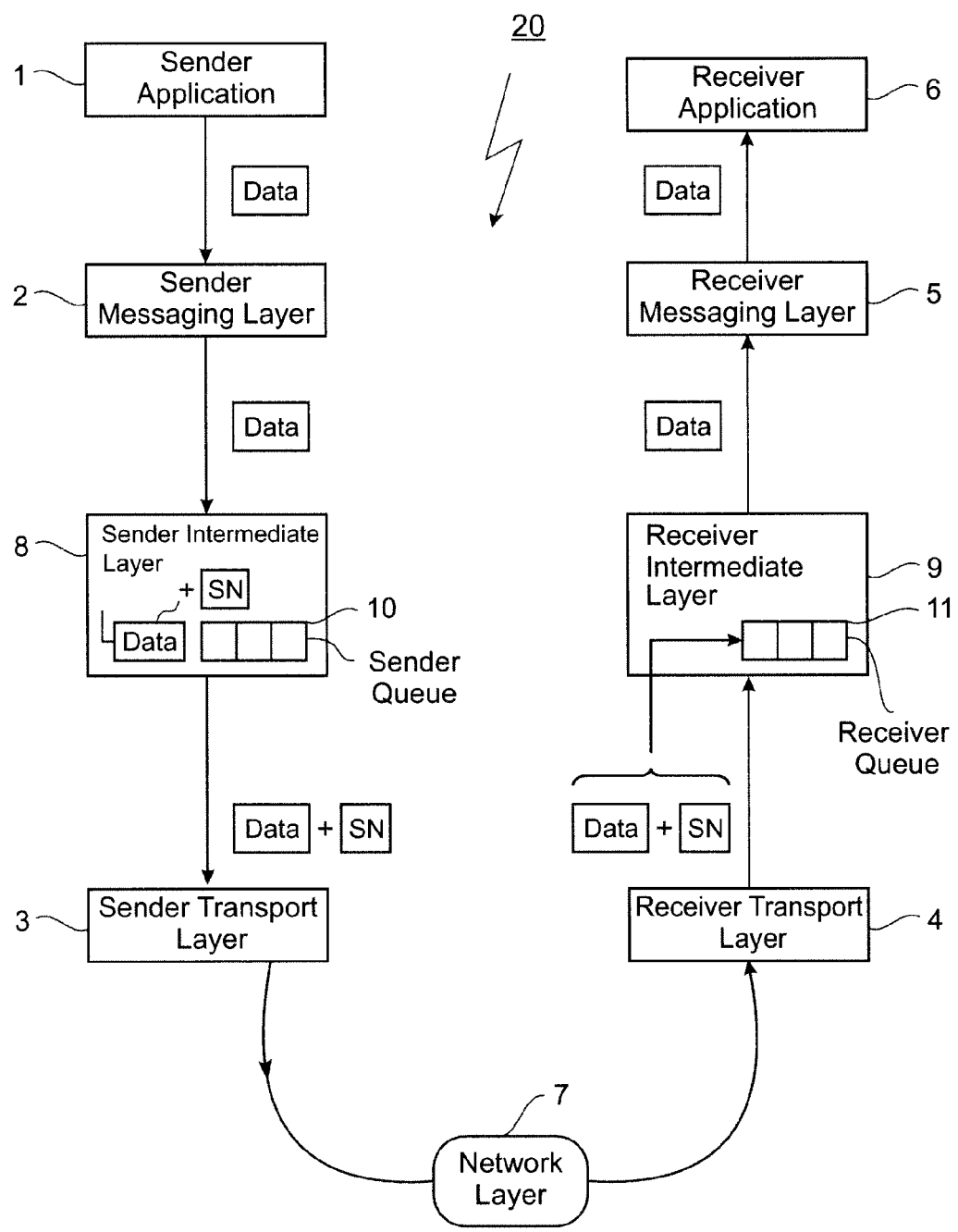
FIG. 2 depicts an embodiment of the present invention.

Reference is now made to FIG. 2 in order to gain an understanding of an embodiment of the present invention. Data is communicated from a sender application 1 to one or more receiver applications 6. The sender and receiver application(s) are implemented in a protocol stack 20 in which, underlying the sender application 1 are a sender messaging layer 2 and a sender transport layer 3 and, correspondingly, a receiver messaging layer 5 and a receiver transport layer 4 are provided below the receiver application 6. The sender transport layer 3 and the receiver transport layer 4 are coupled by way of a network layer 7. The respective messaging layers could, for example, be implemented with messaging middleware such as MQTT and, for the respective transport layers transmission control protocol (TCP) or user datagram protocol (UDP) may be used, for example. The network layer 7 is implemented with an Internet layer in an embodiment of the present invention.

A sender intermediate layer 8 is incorporated between the sender messaging layer 2 and the sender transport layer 3 and a receiver intermediate layer 9 is incorporated between the receiver messaging layer 5 and the receiver transport layer 4. In the step of incorporating the intermediate layers 8, 9 in the protocol stack 20 they are each detachably plugged to their corresponding transport layers 3, 4. The intermediate layers 8, 9 are configured such that their interface characteristics match those of their corresponding transport layers 3, 4. Specifically, the characteristics of the interface of a given intermediate layer 8, 9 disposed adjacent to a given messaging layer 2, 5 are chosen to be the same as the corresponding interface of the transport layer 3, 4 associated with that intermediate layer 8, 9. This offers the advantage that, when transactional support is desired, the intermediate layers 8, 9 may be incorporated into the protocol stack 20 without drastic modification to the overall stack structure and/or interfaces of the layers thereof. Such modular decomposition, for example, to use MQTT with TCP/UDP, or with the intermediate layers according to an embodiment of the present invention, without the need for substantial changes to be made to MQTT offers versatility.

A sender queue 10 is created in a non-volatile data-storage component of the sender intermediate layer 8 and, in a corresponding manner a receiver queue 11 is created in a non-volatile data-storage component of the receiver intermediate layer 9. Data to be communicated to the receiver application 6 is relayed by the sender application 1 down the hierarchy of layers underlying it. This is done such that, at each stage of such relay, the data may be processed to make it compatible for transmission to the next layer in the hierarchy and for reduced loss and/or distortion when transmitted via the network layer 7 to the receiver application side. At the receiver application side, the data is unpacked in a corresponding fashion and progressed up the stack to the receiver application 6. In an embodiment of the present invention, data to be transmitted from the sender application 1 is stored in the sender queue 10 and transmitted to the receiver queue 11 via the sender transport layer 3 and the receiver transport layer 4 that are coupled via the network layer 7.

In the event that there is a subsequent failure at the network layer 7 and/or the receiver application 6, the data can be recovered from the receiver queue 11 and/or retransmitted from the sender queue 10 after a reboot operation. Thus, in contrast to previously-proposed techniques, the data is not irretrievably lost and/or breakdown of the system due to retransmission of the data multiple times at the transport layer 3, 4 and/or messaging layer levels 2, 5 after the reboot operation.

In an embodiment of the present invention, the sender queue 10 and receiver queue 11 are implemented with a sliding window protocol in which the sender intermediate layer 8 is configured to transmit, in the transmitting step, a window of data stored in the sender queue 10 to the receiver queue 11. The sliding window protocol may be implemented in the following way:

Data to be communicated to the receiver application 6 is tagged with a sequence number and placed at the end of the sender queue 10;

The sender intermediate layer 8 is configured to send, in a send operation, a frame of data at the start of the sender queue 10 to the receiver queue 11;

An indication of reception is sent to the sender intermediate layer 8 up until the last data frame read by the receiver intermediate layer 9 and stored in the receiver queue 11;

In response to the indication of reception being received by the sender intermediate layer 8, a next frame of data in the sender queue 10 is advanced to be processed in accordance with the above-described steps;

The above-described steps are repeated until the sender queue 10 is drained.

In the present context, a frame of data may be taken to comprise a single data message or a collection of data messages that are to be transmitted to the receiver application 6. The size of each frame is also adjustable according to the desired flow control of data between the sender application 1 and the receiver application 6. In the specification, the terms "frame" and "data window" are interchangeably used henceforth.

As discussed earlier, the data in the sender queue 10 is transmitted to the receiver queue 11. In this regard, the data is written into the sender queue 10 using a write operation. Unless the queue is full, in which case the write operation would block, the data is now written into non-volatile data-storage. The data written into the sender queue 10 is then written to the sender transport layer 3. From hereon, the data is conveyed via the network layer 7 to the receiver application side, specifically to the receiver transport layer 4. The receiver intermediate layer 9 is configured to read the data from the receiver transport layer 4 and to write it to the receiver queue 11. The data is then read from the receiver queue 11 by the receiver messaging layer 5. In response to the receiver transport layer 4 receiving the data, an acknowledgment message is sent to the sender transport layer 3 that the data has been received. In response to the receiver messaging layer 5 reading the data from the receiver queue 11, it sends a commit message to the receiver intermediate layer 9. In response to receiving the commit message, the receiver intermediate layer 9 is configured to send an acknowledgment message to the sender intermediate layer 8 in respect of the data that has been read and committed to by the receiver messaging layer 5.

Once the sender intermediate layer 8 receives the acknowledgment message from the receiver intermediate layer 9, the data with respect to which the acknowledgment is received is removed from the sender queue 10 and, thereby, from the non-volatile data storage of the sender intermediate layer 8.

Once the receiver intermediate layer 9 receives the commit message from the receiver messaging layer 5, the data with respect to which the commit message is received is removed from the receiver queue 11 and, thereby, from the non-volatile data storage of the receiver intermediate layer 9.

In an embodiment of the present invention, a round-trip time (RTT) is calculated in accordance with the time taken by the receiver messaging layer 5 to read the data from the receiver queue 11 and to send the commit message to the receiver intermediate layer 9. If, after expiry of the round-trip time (RTT) an acknowledgment message is not received from the receiver intermediate layer 9, the sender intermediate layer 8 is configured to retransmit the data in respect of which the acknowledgment message was expected. Unlike previously-proposed techniques, an embodiment of the present invention accounts for application latency in this way. Furthermore, the calculated RTT is used to estimate the RTT for the future transmission of data from the sender application to the receiver application. This feature offers the advantage that the dynamics of data communication between the sender and the receiver application is determined from the system operation and the characteristics thereof.

A further feature of the acknowledgment message is that it comprises information on the available data-storage capacity in the receiver queue 11. This information can be used to advantage in adjusting the flow control of data from the sender queue 10 to the receiver queue 11, for example, by extending the data bandwidth that is transmitted from the sender queue 10 to the receiver queue 11.

The sender intermediate layer 8 may be configured to expect an acknowledgment message in respect of data transmitted to the receiver queue 11 by the expiry of a predetermined time. For example, in one embodiment of the present invention, the predetermined time may be taken to be the round-trip time (RTT). If, on expiry of the predetermined time, the expected acknowledgment message is not received, an interrogation step is performed whereby the sender transport layer 3 is interrogated for the presence of the data in respect of which the acknowledgment is expected. If this data is still in the sender transport layer 3, then the data will not be retransmitted from the sender queue 10 to the sender transport layer 3 and the sender intermediate layer 8 is set to check for the acknowledgment message at a subsequent time. If the data is not in the sender transport layer 3, then the data is retransmitted thereto from the sender queue 10. In this way, failures at the application level and/or the network layer level can be handled by avoiding the pointless retransmission of data, for example.

In an embodiment of the present invention, the sender application 1 could, for example, be a publisher/broker of data on a specific topic. The receiver application 6 could be a broker or subscriber on that specific topic.

The present invention is not limited to the use of MQTT for the messaging layer and any other appropriate messaging layer may be used for this purpose. This also applies to the use of TCP/UDP for the transport layer.

Features of one aspect may be applied to any other aspect and vice versa.

In any of the above aspects, the various features may be implemented in hardware or as software modules running on one or more data processors.

The present invention has been described above purely by way of example and modifications of detail can be made within the scope of the invention.

Each feature disclosed in the description, and, where appropriate, the claims and drawings may be provided independently or in any appropriate combination.

The invention claimed is:

1. A method for transmitting data between a sender queue of a sender intermediate layer of a protocol stack and a receiver queue of a receiver intermediate layer of the protocol stack implemented with a sliding window protocol, the protocol stack including a sender application, a sender messaging layer, the sender intermediate layer, a sender transport layer, a receiver application, a receiver messaging layer, the receiver intermediate layer, and a receiver transport layer, wherein the sender transport layer and the receiver transport layer are coupled by way of a network layer, the method comprising:

receiving a collection of data messages from the sender messaging layer to be communicated to the receiver application;

tagging the collection of data messages with a unique identifier;

writing the collection of data messages tagged with the unique identifier as a data window in the sender queue of the sender intermediate layer, the sender queue configured to store a plurality of data windows, wherein each data window of the plurality of data windows includes a data message or a plurality of data messages;

transmitting a front data window of the sender queue of the sender intermediate layer to the receiver queue of the receiver intermediate layer;

receiving a single receipt-acknowledgement message after the receiver transport layer of the protocol stack has received all of the front data window; and receiving a commit-acknowledgement message after the receiver messaging layer of the protocol stack has read from the receiver intermediate layer all of the front data window, wherein the commit-acknowledgement message includes information of available data storage capacity of the receiver queue.

2. The method of claim 1, wherein the steps of transmitting, receiving a single receipt-acknowledgement message, and receiving a commit-acknowledgement message further comprise:

transmitting a front data window at the front of the sender queue to the receiver queue of the receiver intermediate layer via the sender transport layer, the network layer, and the receiver transport layer;

receiving a single receipt-acknowledgement message from the receiver transport layer after the receiver transport layer has received all of the front data window; and receiving a commit-acknowledgement message from the receiver intermediate layer after the receiver intermediate layer receives a commit message from the receiver messaging layer, wherein said commit message indicates that the receiver messaging layer has read from the receiver intermediate layer all of the front data window.

3. The method of claim 1, wherein the sender queue of the sender intermediate layer is located in non-volatile storage.

4. The method of claim 1, further comprising:

updating the sender queue by removing a transmitted and committed data window from the sender queue, wherein the step of removing follows the step of receiving the commit-acknowledgment message.

5. The method of claim 4, further comprising:

transmitting a next data window of the sender queue to the receiver queue of the receiver intermediate layer.

6. The method of claim 1, further including:

adjusting flow control of data from the sender queue in response to the commit-acknowledgment message.

7. The method of claim 1, further comprising:
estimating an expected round trip time; and
retransmitting the data window if the commit-acknowledgement message is not received prior to expiration of expected round trip time.

8. The method of claim 1, further comprising:
interrogating the sender transport layer to determine whether any data of the front data window remains in the sender transport layer;
retransmitting the front data window if no data remains in the sender transport layer; and
checking for the commit-acknowledgement message at a subsequent time, if any data of the front data window remains in the sender transport layer.

9. The method of claim 1, wherein the unique identifier comprises a sequence number.

10. A method for receiving data from a sender queue of a sender intermediate layer of a protocol stack by a receiver queue of a receiver intermediate layer of the protocol stack implemented with a sliding window protocol, the method comprising:
reading a data window from a receiver transport layer of the protocol stack, the data window comprising a data message or a collection of data messages tagged with a unique identifier, the data window received from the sender queue of the sender intermediate layer;
writing the data window to the receiver queue, the receiver queue configured to store a plurality of data windows received from the receiver queue;
receiving a commit message from a receiver messaging layer of the protocol stack after the receiver messaging layer reads all of the data window from the receiver queue;
removing the data window from the receiver queue;
sending an acknowledgement message to the sender intermediate layer, wherein the acknowledgement message includes information of available data storage capacity of the receiver queue; and
calculating a round-trip time, wherein the round trip time is the amount of time the receiver messaging layer takes to read the data window from the receiver queue and to send the commit message to the receiver intermediate layer.

11. The method of claim 10, further comprising:
reading a next data window from the receiver transport layer, after the step of sending the acknowledgement message;
writing the next data window to the receiver queue;
receiving a next commit message from the receiver messaging layer after the receiver messaging layer reads all of the next data window from the receiver queue;
removing the next data window from the receiver queue; and
sending a next acknowledgement message to the sender intermediate layer after the step of receiving the next commit message.

12. The method of claim 10, wherein the receiver queue of the receiver intermediate layer is located in non-volatile storage.

13. The method of claim 10, wherein the unique identifier comprises a sequence number.

14. A computer program for transmitting data between a sender queue of a sender intermediate layer of a protocol stack and a receiver queue of a receiver intermediate layer of the protocol stack implemented with a sliding window protocol, the protocol stack including a sender application, a sender messaging layer, the sender intermediate layer, a sender transport layer, a receiver application, a receiver messaging layer, the receiver intermediate layer, and a receiver transport layer, wherein the sender transport layer and the receiver transport layer are coupled by way of a network layer, the computer program comprising instructions stored in a non-transitory computer readable storage medium, the instructions executable by a processor for:
receiving a collection of data messages from the sender messaging layer to be communicated to the receiver application;
tagging the collection of data messages with a unique identifier;
writing the collection of data messages tagged with the unique identifier as a data window in the sender queue of the sender intermediate layer, the sender queue configured to store a plurality of data windows, wherein each data window of the plurality of data windows includes a data message or a plurality of data messages;
transmitting a front data window of the sender queue of the sender intermediate layer to the receiver queue of the receiver intermediate layer;
receiving a single receipt-acknowledgement message after the receiver transport layer of the protocol stack has received all of the front data window; and
receiving a commit-acknowledgement message after the receiver messaging layer of the protocol stack has read from the receiver intermediate layer all of the front data window, wherein the commit-acknowledgement message includes information of available data storage capacity of the receiver queue.

* * * * *